H. A. FREDERICK.
TELEPHONE RECEIVER.
APPLICATION FILED JULY 20, 1916.

1,273,351.

Patented July 23, 1918.
2 SHEETS—SHEET 1.

SILICON STEEL    TUNGSTEN STEEL

Inventor:
Halsey A. Frederick.
by [signature] Atty.

H. A. FREDERICK.
TELEPHONE RECEIVER.
APPLICATION FILED JULY 20, 1916.
1,273,351.
Patented July 23, 1918.
2 SHEETS—SHEET 2.
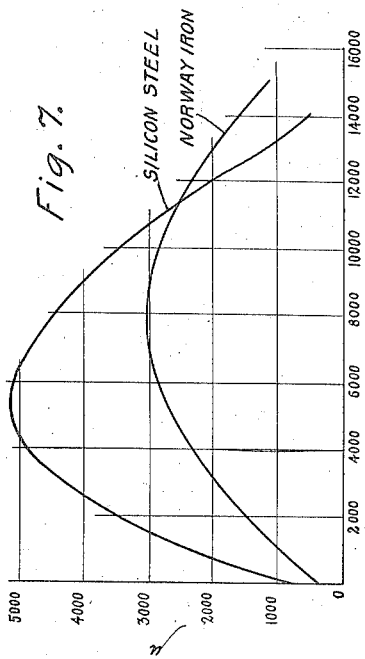
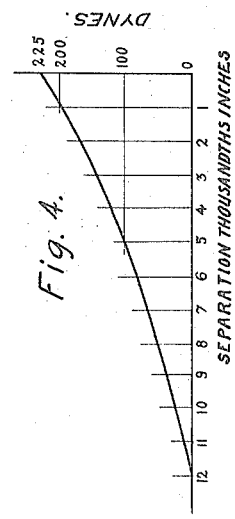
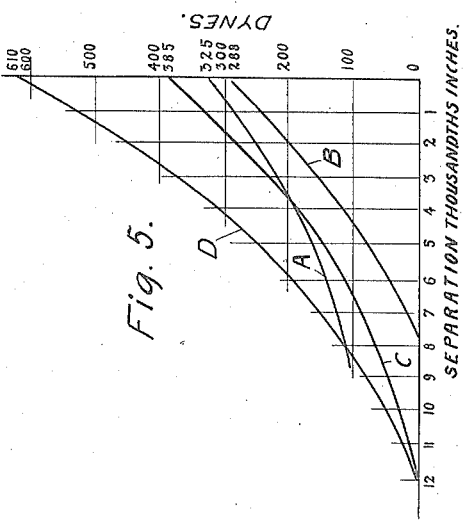
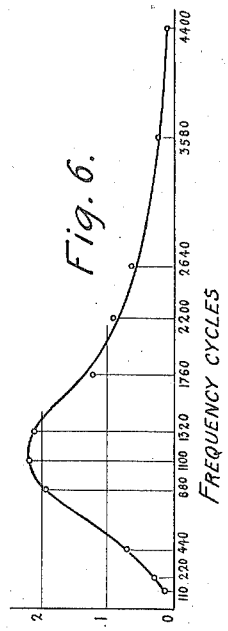
Inventor:
Halsey A. Frederick.
by [signature] Att'y.

UNITED STATES PATENT OFFICE.

HALSEY A. FREDERICK, OF HACKENSACK, NEW JERSEY, ASSIGNOR TO WESTERN ELECTRIC COMPANY, INCORPORATED, OF NEW YORK, N. Y., A CORPORATION OF NEW YORK.

TELEPHONE-RECEIVER.

1,273,351.                    Specification of Letters Patent.    Patented July 23, 1918.

Application filed July 20, 1916.   Serial No. 110,319.

*To all whom it may concern:*

Be it known that I, HALSEY A. FREDERICK, a citizen of the United States, residing at Hackensack, in the county of Bergen and State of New Jersey, have invented certain new and useful Improvements in Telephone-Receivers, of which the following is a full, clear, concise, and exact description.

This invention relates to telephone receivers.

The object of this invention in general is to produce a receiver of improved efficiency of transmission and increased quality of articulation and one that is more economical in design from a standpoint of cost of production.

In accordance with one feature of this invention, use is made of a diaphragm of such proportions that the damping effect upon the diaphragm, when the receiver is held closely to the ear, will cause such a rate of decay of free vibrations of the diaphragm that they will be practically inaudible to the ear. Preferably this is obtained by making use of a diaphragm of approximately the usual natural period and so proportioning it that the acoustic damping effect, due to the ear of the user under conditions of ordinary usage for such receivers, will have a ratio to the mechanical and magnetic damping of three or more to one. For the best results the proportion should be such that a damping constant, the measure of which is the resistance to vibration divided by twice the mass, equal to five hundred or more c. g. s. units (numeric seconds) is obtained.

In accordance with another feature of this invention there is provided a magnetic structure of improved efficiency. This is gained by providing a magnet system of such materials and so proportioned that the steady flux density at the tips of the cores of the electromagnet, due to the permanent magnetizing force, at the normal air-gap separation of the cores and the diaphragm, will be slightly above the point of maximum permeability and such that the permeability will decrease rapidly upon a decrease of the air-gap, and such that at the tips of the cores, the product of the polarizing flux density by the effective permeability for small oscillations of a frequency of approximately the maximum sensitivity of the human ear, will be a maximum. This result is attained by choosing for the cores a material having a sharply defined permeability curve which decreases rapidly beyond its point of maximum permeability, and applying to these cores a permanent magnetizing force which will maintain a flux density in them, at normal air-gap separation, of a value which is above the point of maximum permeability of the cores and at such value that with the size and material used for cores at their tips, the product of this polarizing flux density by the effective permeability for small oscillations at a frequency of approximately the maximum sensitivity of the average human ear, is a maximum. Silicon steel has been found to embody the necessary magnetic characteristics to render it suitable for the core material, although other materials having such characteristics as to produce the desired result may be used.

By the use of such a magnetic material, polarized to such a density that the product of the polarizing flux density by the effective permeability is a maximum, the magnetic system is made such as to operate at the maximum possible efficiency. In addition, by the use of such a magnetic material of sharply defined permeability curve polarized to a flux density above that required for maximum permeability, it is possible to decrease the actual air-gap without danger of the diaphragm being drawn in and adhering to the poles.

Other features of the invention relate to the provisions made for concentrating the windings near the core tips and reducing the reluctance of the air path for the alternating flux.

In receivers of the magnetic type, a diaphragm is the practical agent of sound emission and all diaphragms have the characteristics of resonance which will cause them to give forth free vibrations of their natural or resonant frequency when disturbed, and they will respond most readily to forces having frequencies in the neighborhood of their natural frequencies. Since the diaphragm best adapted for use is one which most readily responds to a frequency which is approximately the frequency of maximum sensitivity of the human ear, the free vibrations given forth by such a diaphragm are those which are most detrimental to the faithful reproduction of speech. In order, therefore, to obtain the best results in quality and articulation, these free vibrations should be as nearly imperceptible to the ear as it is possible to make them. The ratio of twice the mass to the vibratory resistance is a measure of the rate of decay for such free vibrations and it follows therefore, that, in order to have accurate reproduction of speech as well as a freedom from disturbing sounds, the ratio of mass to vibratory resistance should be made as small as possible. The total vibratory resistance of the diaphragm causes it to dissipate energy when it is vibrated or moved. This energy is composed of three components, viz: the energy emitted as sound and absorbed by external objects which may be termed useful energy; the energy dissipated through the agency of mechanical friction, composed of internal mechanical friction in the diaphragm, its clamping supports and other adjacent parts which are caused to move or vibrate; and energy which is dissipated in the iron in the form of eddy currents in the diaphragm, cores and other electrically conducting parts in the varying magnetic field. The latter two represent a dead loss and it is found that as the mass is reduced it is possible by proper design to hold the ratio of the mass to the sum of the frictional and iron losses approximately constant but not decrease it materially, and since the acoustical energy dissipated can be maintained constant within limits independent of the mass, it follows that the ends sought can be obtained only by a reduction of mass. For the best efficiency, however, the oscillatory force acting on the diaphragm per unit of electric power received should be as great as possible, and it is necessary therefore that the diaphragm should be of good magnetic material and of sufficient thickness to readily conduct steady and alternating fluxes from one core to the other in a bipolar receiver. Magnetic materials suitable for such diaphragms are relatively heavy so that some sacrifice in lightness of diaphragm, which would produce the best acoustic efficiency, must be made in favor of magnetic qualities.

In reducing the mass a properly corresponding reduction in both diameter and thickness must be made, if the same material is retained, in order that the proper reduction in stiffness be obtained so as to maintain the diaphragm at the desired natural frequency. In reducing the stiffness by a reduction of the mass, it is not only possible but unavoidable to reduce the steady magnetic pull and this must be set at a value such that, at all air-gaps smaller than normal working separation of the diaphragm and cores, the elastic force tending to restore the diaphragm to its working position shall be greater than the pull of the magnets. Reducing the magnetic force and designing the cores to control the force as the gap is decreased, make possible a decrease in the normal air-gap over that previously used. Moreover, the small perimeter of the cores which it is possible to use in the device under consideration not only permits of the use of a finer wire with the windings concentrated nearer to the core tips, but the cores may be brought together so that the effective magnetic force upon the diaphragm is concentrated in a small space near the center thereof, and the reluctance of the air path about and below the windings and the path through the diaphragm for the lines of flux of the electromagnet is greatly reduced, due to decreased length.

In the drawings illustrating this invention, Figure 1 is a plan view, with the cap removed, of a watch case receiver embodying the features of the invention.

Fig. 4 is a curve showing the diaphragm stiffness due to the cap.

Fig. 5 shows curves of the force, deflection and magnetic attraction for a receiver made in accordance with this invention.

Fig. 6 is a composite curve of the apparent variation in sensitiveness of the human ear with frequency, taken with four observers.

Fig. 7 shows curves giving the permeabilities of silicon steel and Norway iron at different flux densities.

Fig. 8 shows curves of the product of flux density by effective permeability for alternating flux changes of small amplitude of a period approximately that of the human ear for silicon steel and Norway iron at various flux densities.

Figure 1:
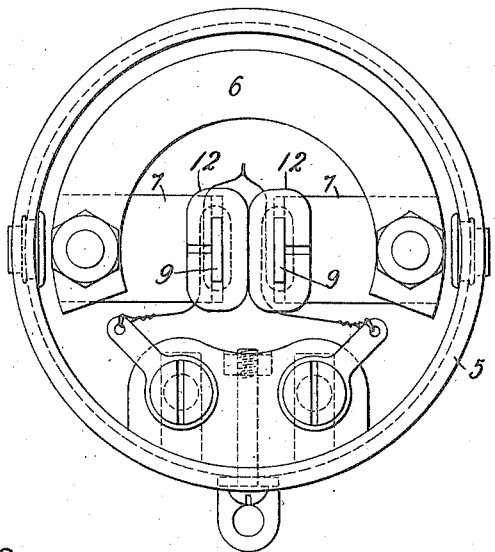
Figure 2:
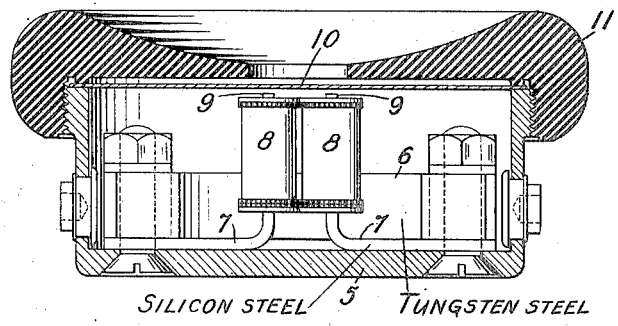
Fig. 2 is a view in cross section of the receiver.
Figure 3:
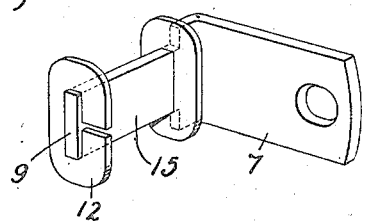
Fig. 3 is a detail perspective view of an electro-magnet core forming a part of the device.

As shown in the drawings, 5 designates a receiver case preferably of metal, within which is located a permanent magnet 6 to the opposite poles of which are secured pole pieces 7, 7 carrying windings 8, 8 and having their pole faces 9, 9 located adjacent a diaphragm 10 which is clamped to the casing 5 by means of a cap or ear piece 11. The cores are shown as provided with slotted metal spool heads 12, 12 at their tips.

The diaphragm 10 should, of course, be of good magnetic material, preferably soft iron, and should have a natural frequency of between eight hundred and twelve hundred pulsations per second, which is approximately the frequency of maximum sensitivity of the human ear as shown by the curve Fig. 6. As previously pointed out, however, the best results are to be obtained by the use of a diaphragm in which the ratio of the acoustic damping, or external friction due to the ear of the user, to the internal friction, or damping due to mechanical and magnetic resistance, should be three or more in order that while using a magnetic and mechanical system such that the internal dissipation of energy is reduced to a minimum, free vibrations of the diaphragm will have a rate of decay rendering them practically inaudible to the human ear. The time of endurance of such free vibrations is measured by the ratio of twice the mass to the vibrating resistance, and since in any given diaphragm, the ratio of the mass to the sum of the components of the resistance of the diaphragm, comprising the internal mechanical friction and that due to iron loss, may by careful design intended to minimize them, be kept practically fixed, it follows that the ratio of the external friction to the internal friction of three or more to one can only be obtained by use of a diaphragm in which the mass is small as possible. On the other hand, there is a lower limit for the mass, imposed by the fact that a telephone receiver must efficiently convert a certain amount of electrical power into sound power, and for this amount of power to be handled efficiently, a certain amount of iron is necessary. Also, it is necessary to keep the ratio of the alternating flux to the steady or polarizing flux below a certain value in order to avoid distortion of wave form in this conversion. For the purpose of this invention, the diaphragm 10 is made of soft iron, preferably Norway iron, and is approximately one and three-quarters inches in diameter and about six thousandths of an inch thick and has a free diameter of one and six tenths (1.6) inches. A diaphragm of these proportions has been found to approximate the acoustical properties sought and at the same time it contains sufficient iron to readily conduct steady and alternating fluxes from one core to another in a bipolar receiver. Thus it combines the characteristics necessary for most accurate reproduction of wave form and maximum efficiency in a receiver of this type.

It is of course necessary in such receivers that at all air-gaps, smaller than normal working separation of the diaphragm and cores, the elastic force tending to restore the diaphragm to its working position shall be greater than the pull of the magnets. In order therefore that the freezing of the diaphragm to the cores may be avoided and at the same time provide for the best magnetic efficiency in a receiver using a diaphragm of the dimensions and material chosen, the cores 7, 7 are made from a material having a relatively sharp permeability curve, and the permanent magnet 6 is made of such strength that at normal air-gap separation the flux density at the faces of the cores 7, 7 will be slightly above the position for maximum value for permeability and will have a rapidly increasing reluctance with a decrease in the air gap. Silicon steel has been found to be a desirable material for the cores 7, 7 although it is quite obvious that other material having practically the same characteristics may be used. The cores 7, 7 are preferably L-shaped and each is provided with a reduced portion 15 on one leg which is adapted to receive the winding, this reduced portion being ended at a distance somewhat above the point of the bend. The cores 7, 7 are clamped to the permanent magnet 6 between the lower face thereof and the bottom of the casing 5. This material of the cores 7, 7 between the lower end of the windings 8, 8 and the bends in the cores has an area of cross section eight fifths (8/5) the pole face area and provides a path of greater cross section for lines of flux between the cores than would exist if the cores were bent away directly below the windings or were not made wider and thus the reluctance of the air path between the cores is reduced. With the diaphragm 10 of the proportions used in this invention, the cores 7, 7 may be made with a pole face area of between ten and thirteen thousandths of a square inch and a ratio of breadth to thickness of between five to one (5:1) and six to one (6:1). With cores of a perimeter such as is used in this device the average length of turn of the winding is such that a winding of fine wire concentrated at the pole tips may be used. Furthermore, the poles may be brought close together so that the surface of diaphragm acted upon by the pole pieces is limited to a small area near the center of the diaphragm. The air-gap separation between the pole faces and the plane of the diaphragm seat with this structure is approximately twelve thousandths of an inch.

The permanent magnet 6 preferably of tungsten steel is semi-circular in shape and has a cross sectional area of approximately one sixteenth square inches, a radius of curvature at the outside of about three-quarters of an inch and a mean radius of curvature of about five eighths (5/8) inches. The magnetizing force of this permanent magnet 6 is such that at normal air-gap separation of the cores 7, 7 and diaphragm 10, the flux density at the pole faces of said cores will be approximately eight thousand gausses. By reference to the permeability curve for silicon steel shown on Fig. 7, it will be noted that the maximum permeability is at a density of in the neighborhood of six thousand gausses, also that at densities above this the permeability curve drops quite abruptly. It will also be noted from Fig. 8 that the product of the polarizing flux density by the effective permeability for alternating flux at a frequency of approximately that of the maximum sensitivity of the average human ear and for a cross section of pole of approximately that used, is a maximum at about eight thousand gausses polarizing flux density. By providing a polarizing flux of such value that the product shall be a maximum at a flux density of about eight thousand gausses, it will be seen that any increase in flux density due to decreasing the air-gap will result in a decrease in the permeability, as at eight thousand gausses the permeability curve of Fig. 7 has passed beyond the peak. Moreover, as the product of polarizing flux by effective permeability for the alternating flux, is the measure of magnetic efficiency of a telephone receiver, by working at about eight thousand gausses the system is working at substantially maximum magnetic efficiency.

The curves in Fig. 5 show at various separations between poles and diaphragm the force required to deflect the diaphragm with and without magnet and cap, magnetic attraction and the components of the stiffness of the diaphragm of a receiver made in accordance with the features of this invention. The curve A on this figure shows the magnetic attraction on the diaphragm to be about three hundred and twenty-five thousandths (.325) dynes at zero separation and to decrease at a fairly uniform rate to fourteen hundredths (.14) dynes at normal air-gap separation of about seventy six ten thousandths inches. The fact that this force of magnetic attraction increases at a fairly uniform rate instead of more and more rapidly as separation between the diaphragm and pole tips is decreased is largely due to the fact that the flux density in the poles of this receiver is greater than required for maximum permeability. Curve B, which shows the force necessary to deflect the diaphragm with the magnet present is seen to rise steadily at even very small air-gaps and shows no tendency toward instability which will be found to be the case with receivers not possessing the magnetic features described above. In fact with other receivers this curve is found to have a point of inflection at small separation, beyond which point the curve actually has a negative slope. Curve C, which shows the force required to deflect the diaphragm without magnet or cap present, rises more rapidly than the curve A of magnetic attraction and increases more rapidly at small air-gap separation than the curve A, the two crossing at about thirty-four ten thousandths inches separation. This will be the separation at which the diaphragm will remain if the cap is removed. Curve D of Fig. 5 shows the force necessary to deflect the diaphragm when clamped but without the magnet present. The curve of Fig. 4 is the difference between C and D of Fig. 5.

A receiver made in accordance with this invention has been found by tests to give better quality and articulation over other forms of receivers due to the proportioning of the diaphragm, and a gain in transmission efficiency over known commercial devices due primarily to the proportioning of the parts, the most important consideration being the determination of the flux density in the poles to produce operation at the desired point in the permeability curve. Such a receiver may be made of smaller size with a consequent reduction in weight and cost of production due to the economy in material used.

What is claimed is:

1. In a telephone receiver, a vibrating diaphragm and a motor system therefor including electromagnetic cores of silicon steel having a pole face area of between ten and thirteen thousandths of a square inch and a ratio of breadth to thickness of between five to one (5:1) and six to one (6:1).

2. In a telephone receiver, a vibrating diaphragm and a motor system therefor including silicon steel cores and windings thereon, said cores having a pole face area of between ten and thirteen thousandths of a square inch and an area of cross section below the windings thereon of approximately eight fifths (8/5) the area of the pole face.

3. In a telephone receiver, a diaphragm of a material possessing a relatively high permeability at high flux densities, said diaphragm being clamped only at its periphery, electromagnets having cores of a material having a sharply defined permeability curve falling off rapidly beyond the point of maximum permeability, and a permanent magnet the relative dimensions of said permanent magnet and said cores being such that there is maintained in the tips of the cores, at normal air-gap separation, a flux density of a value above that required to produce the maximum permeability of the cores.

4. In a telephone receiver, a vibrating diaphragm having a free diameter of approximately one and six-tenths inches and a thickness of approximately six-thousandths of an inch, electromagnetic cores located adjacent to said diaphragm, each having a pole face area of between ten and thirteen thousandths of a square inch, said cores being formed of a material having a permeability curve with a sharply defined peak, and a permanent magnet to the opposite poles of which said cores are attached, said permanent magnet having a cross-sectional area of approximately one-sixteenth square inches and a mean radius of approximately five-eighths of an inch.

5. In a telephone receiver, a vibrating diaphragm of soft iron, electromagnets for operating said diaphragm, silicon steel cores for said electromagnets having a pole face area of between ten and thirteen thousandths of a square inch and separated from the plane of the periphery of said diaphragm approximately twelve thousandths of an inch, and a permanent magnet of tungsten steel to the opposite poles of which said cores are attached, said permanent magnet being of such size and strength as to maintain a flux density in the pole tips of said cores of a value above that required to produce the maximum permeability thereof at normal air-gap separation of said cores and said diaphragm.

6. In a telephone receiver adapted to be applied to the ear of the user, a diaphragm of magnetic material subjected to an internal resistance due to the magnetic and mechanical friction and an external resistance due to the ear of the user, said diaphragm being so proportioned that the external resistance is three or more times that of the internal resistance.

7. In a telephone receiver adapted to be applied to the ear of the user, a diaphragm of magnetic material clamped at its periphery and having a natural frequency approximately that of the maximum sensitivity of the ear, said diaphragm being subjected to an external resistance due to the ear of the user and an internal resistance due to magnetic and mechanical friction and having a mass such that the external resistance is three or more times that of the internal resistance.

8. In a telephone receiver adapted to be applied to the ear of the user, a diaphragm of magnetic material clamped at its periphery and so proportioned that a damping constant, as defined by the resistance divided by twice the mass, equal to five hundred or more c. g. s. units is obtained when the receiver is held closely to the ear of the user.

9. In a telephone receiver adapted to be held closely to the ear of the user, a diaphragm of magnetic material clamped at its periphery and so proportioned that the effective damping resistance due to the ear of the user is three times or more than that of the resistance due to mechanical and magnetic friction whereby a damping constant, measured by the resistance divided by twice the mass, of five hundred or more c. g. s. units is obtained.

10. In a telephone receiver adapted to be applied to the ear of the user, a diaphragm of magnetic material clamped at its periphery and having a natural frequency, when applied to the ear, of approximately the maximum sensitivity of the ear, and having a mass such that the resistance to free vibrations of the diaphragm when the receiver is closely applied to the ear of the user divided by twice the mass will give a damping constant for the diaphragm of five hundred or more c. g. s. units.

11. In a telephone receiver, a diaphragm of magnetic material and a magnetic motor system for said diaphragm, including electromagnetic cores of a material having a sharply defined permeability peak, and a permanent magnetizing force of such strength that the flux density at the tips of the cores will be at a value above the point required to produce maximum permeability at normal air-gap separation of the diaphragm and tips of said cores, the permeability decreasing upon a decrease of this air-gap.

12. In a telephone receiver, a diaphragm of magnetic material and a motor system for moving said diaphragm, said motor system including electromagnetic cores of a material having a sharply defined permeability curve falling off rapidly beyond the point of maximum permeability, and a permanent magnetizing force for maintaining a flux density in said cores at a value above the point required to produce maximum permeability at normal air-gap separation of the cores and diaphragm and on the down slope of the curve whereby the permeability is decreased upon a decrease of the normal air-gap separation due to the movement of the diaphragm.

13. In a telephone receiver adapted to be applied to the ear of the user, a diaphragm of magnetic material clamped at its periphery and so proportioned that a damping constant, of the resistance divided by twice the mass, equal to five hundred or more c. g. s. units is obtained when the receiver is held closely to the ear, and a motor system for said diaphragm including electromagnetic cores having a sharply defined permeability peak and a permanent magnetic force of such strength that the flux density at the tips of the cores will be at a value above the point required to produce maximum permeability at normal air-gap separation of the diaphragm and tips of said cores and the permeability will decrease upon a decrease of this air-gap.

In witness whereof, I hereunto subscribe my name this 19th day of July, A. D. 1916.

HALSEY A. FREDERICK.